Patented Jan. 23, 1923.

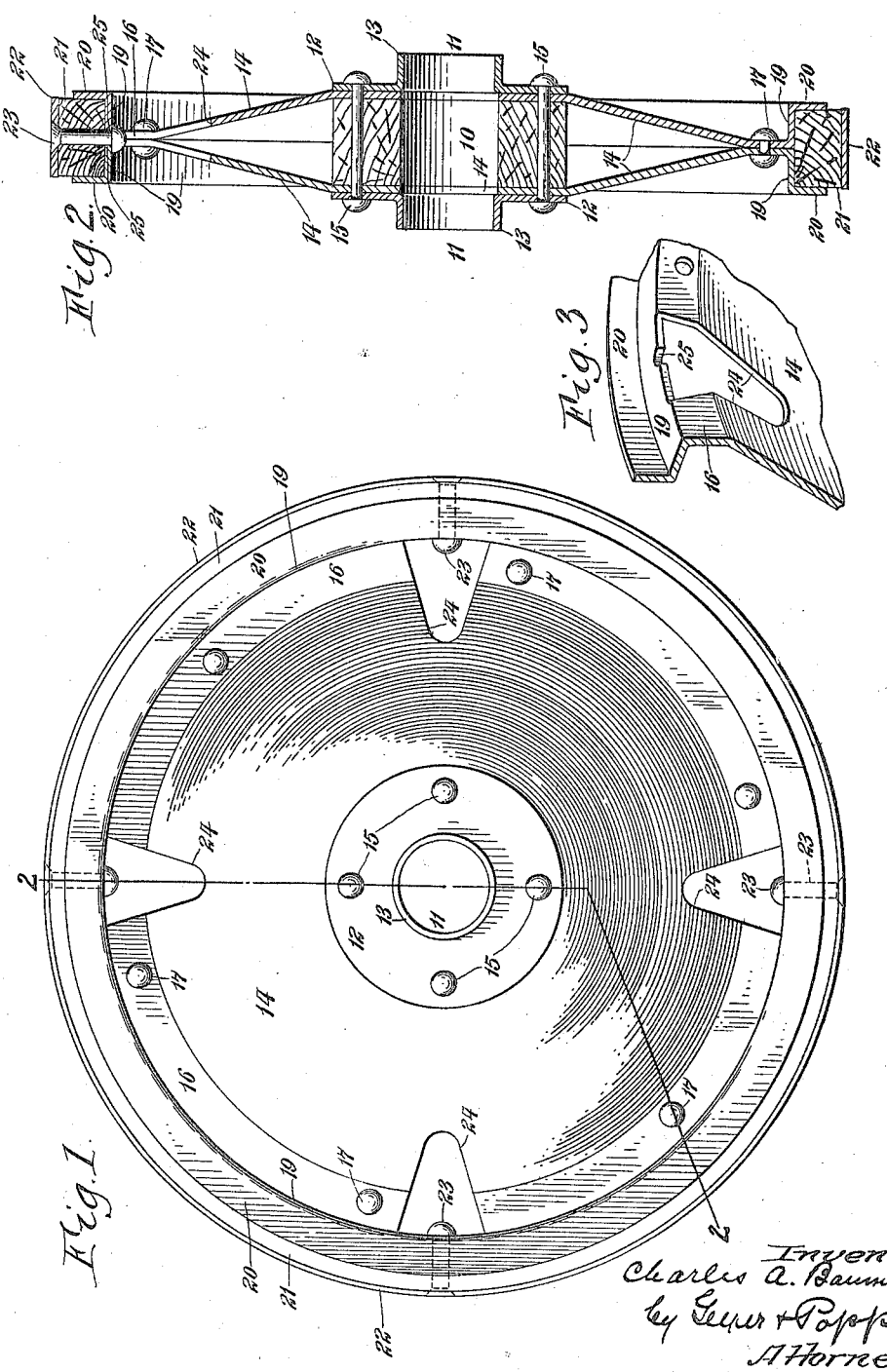

1,443,113

UNITED STATES PATENT OFFICE.

CHARLES A. BAUMLER, OF BUFFALO, NEW YORK, ASSIGNOR TO AUTO-WHEEL COASTER COMPANY, INC., OF NORTH TONAWANDA, NEW YORK, A CORPORATION OF NEW YORK.

VEHICLE WHEEL.

Application filed May 11, 1921. Serial No. 468,606.

*To all whom it may concern:*

Be it known that I, CHARLES A. BAUMLER, a citizen of the United States, residing in Buffalo, in the county of Erie and State of New York, have invented new and useful Improvements in Vehicle Wheels, of which the following is a specification.

This invention relates to a vehicle wheel and more particularly to a wheel which is used in toy wagons or small toy automobiles for carrying children and which must therefore be subjected at times to much abuse and yet which must be inexpensive and simple in construction.

One of the objects of the invention is to produce a production or machine made wheel in which the tire thereof is prevented from moving circumferentially relatively to the wooden felly thereof, even though said felly has become considerably dried out and shrunken in the course of time. A further object of the invention is to provide an improved wheel which is principally composed of sheet metal and yet which permits of the use of wood at the hub and rim thereof so as to absorb the noise and vibration which would be incident to an all metal construction. A still further object of the invention is to provide a convenient means of riveting the outer rivets which secure the tire, the felly and the disk plates together.

In the accompanying drawings:

Figure 1 is a side elevation of the improved vehicle wheel. Figure 2 is a section thereof taken on line 2—2, Fig. 1. Figure 3 is a fragmentary detail of the outer portion of one of the disk plates.

Similar characters of reference refer to like parts throughout the several views.

10 represents a hollow, ring or large washer-shaped hub which is preferably constructed of wood, fiber or similar material for reducing the noise and the vibration of the wheel. Disposed coaxially on either end of said wooden hub are two metal hub rings 11 which are provided with the laterally extending annular flanges 12 and the cylindrical and longitudinally, outwardly projecting supporting flanges 13 which go to make up the hub proper of the wheel. Interposed between each of said metal hub rings 11 and the adjacent outer or end face of the wooden hub 10, is a disk plate 14. The pair of said disk plates, and the pair of hub rings 11 are secured to each other and to the wooden hub 10 by means of a plurality of longitudinal hub rivets 15, which pass completely through all of the aforementioned members and have their heads riveted down and bearing against the outer faces of the lateral annular flanges 12 of the hub rings 11.

The said disk plates 14 are somewhat conical in shape, their inner or central parts being separated or spread longitudinally apart somewhat by reason of the wooden hub 10 while their outer parts or circumferences meet with their flat faces 16 and are suitably joined together by means of a plurality of disk rivets 17. Outwardly of these flat faces 16, the circumferential edge of each of these disk plates is bent at right angles sharply and longitudinally outwardly to form the lateral, circumferential flange 19 and the outer edge of the latter is, in turn, bent laterally outwardly to form the retaining flange 20. In the manufacture of the invention, all of the aforementioned members are first assembled and riveted together i. e., the two disk plates 14, the two hub rings 11 and the wooden hub 10.

Disposed outwardly of the circumferential flanges 19 of the disk plates and in between the retaining flanges 20 thereof, is a felly 21 which is preferably constructed of wood or like noise and vibration reducing material. This felly may if desired, be constructed in two or more sections as is common practice in the wheelwright art. A metal tire or circular rim 22 is arranged on the outer flat circumferential face of said felly. This metal tire and wooden felly, together with the two metal disk plates 14, are all held together by a plurality of rim rivets 23, whose outer heads are suitably countersunk in the periphery of the said rim and whose inner heads bear against the inner faces of the circumferential flanges 19 of the disk plates 14. To accommodate the inner heads of these rim rivets 23 and also to permit of readily introducing a suitable riveting anvil for the purpose of riveting the same, each of the disk plates 14 has a segmental portion 24 cut away in the vicinity of each of said rim rivets 23. In the fabrication of these disk plates 14, the cutting-away or stamping operation is, of course, performed prior to the assembling of said disk plates. The inner heads of the rim rivets 23 bear against both of the said disk plates 14 and the shanks of said rivets are received within a pair of semi-circular notches 25, each pair of said notches embracing half of the shank of said rivet. These notches 25 by reason of their engagement with the shank of their companion rim rivets 23, prevent any circumferential displacement of the felly 21 relatively to either of said disk plates 14. Also said rim rivets prevent a circumferential displacement of said felly 21 relatively to the metal rim or tire 22, so that said rim rivets not only prevent the circumferential displacement of four different members but they also serve to radially bind all four members together.

It is apparent that all of the metal construction of this improved vehicle wheel is a pressed or sheet metal proposition, and the punching dies for the same are consequently of simple form. For instance, each of the segment or V-shaped clearance openings 24 is stamped out at the same time, and is a part of the same opening, as is its companion semi-circular notch 25. That is, no additional holes have to be punched out for the reception of the rim rivets 23. In case it is desired to replace the tire 22 or the felly 21, it is merely necessary to cut off the heads of the rivets 23 and replace the worn part, without in any way disturbing the wheel proper, i. e., the disk plates 14 and the hub members, and without removing the disk rivets 17. Furthermore, both during the original assembling of the wheel and at any time thereafter, when it is desired to operate upon the rim rivets 23, the same is facilitated by reason of the cut-away clearance portions 24 which permit the ready insertion of a cold chisel or of a riveting anvil, as the case may be.

I claim as my invention:

1. A vehicle wheel comprising a disk plate provided with a plurality of notches, a felly arranged on the periphery of said disk plate, and a plurality of rivets passing radially through said felly and each engaging with one of the notches of said disk plate.

2. A vehicle wheel comprising a pair of disk plates having a plurality of pairs of notches on their opposing inner peripheral edges which register with each other, a felly arranged on the peripheries of said disk plates and over the said notches thereof, and a plurality of rivets each passing radially through said felly and through a pair of companion registering notches of said disk plates.

3. A vehicle wheel comprising a pair of disk plates bearing inwardly against each other and provided with a plurality of pairs of notches, the members of each pair opening toward and registering with each other, a felly arranged on the peripheries of said disk plates and extending over said notches, a tire arranged around the felly, and a plurality of rivets disposed radially and each passing through said tire and felly and through a pair of the said notches of said disk plates.

4. A vehicle wheel comprising a pair of disk plates bearing inwardly against each other and provided with a plurality of pairs of notches which open in toward and the members of each pair registering with each other, and also provided with clearance openings arranged inwardly of said notches, a felly arranged on the peripheries of said disk plates, and a plurality of rivets each passing through said felly and through a pair of said notches and having its head arranged in the said clearance openings of said disk plates.

5. A vehicle wheel comprising a disk plate having clearance openings and also having notches, each of which registers with and opens inwardly into one of the aforesaid clearance openings, a felly arranged on the periphery of said disk plate, and a plurality of tire rivets each passing through said felly and also through the respective notch and opening in said disk plate.

6. A vehicle wheel comprising a pair of disk plates permanently secured together and having radially extending clearance openings and inwardly extending notches, the members of which are arranged in pairs and register with each other and which open into said clearance openings, a felly arranged on the peripheries of said disk plates, and a plurality of rivets each passing through said felly and also through a pair of said notches of said disk plates and having its head disposed in the said clearance openings of said disk plates.

7. A vehicle wheel comprising a pair of disk plates permanently secured together and each having a peripheral flange and notches at the inner edges of said flanges which register with the notches in the other disk plate and also having clearance openings disposed inwardly of said flanges, a felly disposed outwardly of said flanges, and a plurality of rivets passing through said felly and notches and each having its head arranged in one of said clearance openings.

8. A vehicle wheel comprising a pair of conical disk plates permanently secured together at their outer parts and having registering notches and clearance openings adjacent to said notches and having cylindrical annular flanges formed on the peripheries of said disks and also having outwardly projecting annular flanges formed at the outer edges of said cylindrical flanges, a felly disposed between said outwardly projecting flanges and outside of said cylindrical flanges, a tire arranged on the periphery of said felly, a plurality of rivets each passing through said tire and felly and through a pair of said notches and having its head disposed within one of said clearance openings, and a hub disposed between the inner parts of said disk plates.

CHARLES A. BAUMLER.